Dec. 17, 1968 A. DOUNOUCOS 3,416,985

METHOD FOR MAKING A GAS TRANSFER DEVICE

Filed June 30, 1967 2 Sheets-Sheet 1

Inventor:
Angelo Dounoucos,
by Aurrieur Mitchell
His Attorney.

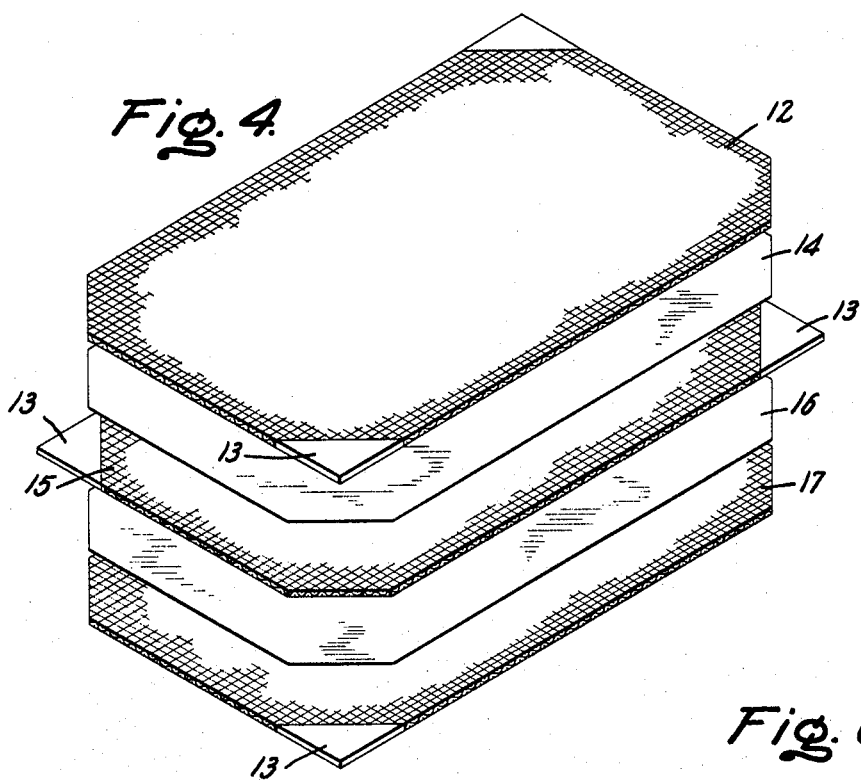
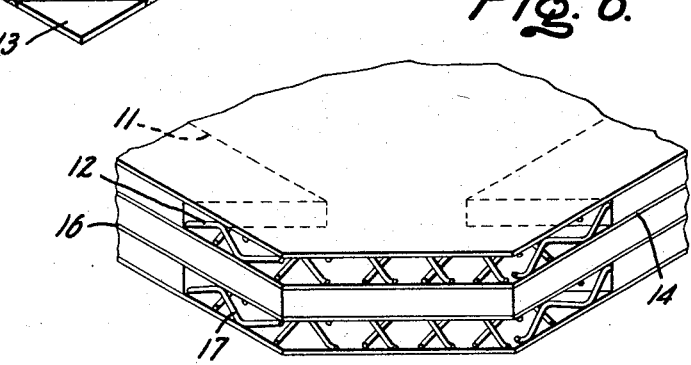
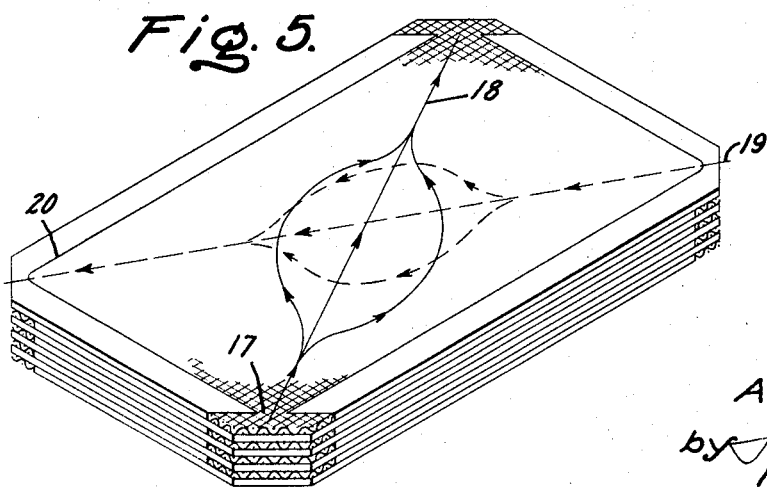

3,416,985
METHOD FOR MAKING A GAS TRANSFER DEVICE
Angelo Dounoucos, Schenectady, N.Y., assignor to General Electric Company, a corporation of New York
Continuation-in-part of application Ser. No. 482,770, Aug. 26, 1965. This application June 30, 1967, Ser. No. 650,465
6 Claims. (Cl. 156—289)

ABSTRACT OF THE DISCLOSURE

A soluble coating is put into a wire screen at a location on the edge where it is desired to have a flow passage. The wire screen is then disposed between permselective membranes contiguous therewith so that after the sandwich arrangement of screen and membranes is bonded at its edges to form a sealed composite layered exchanger, the coating can be washed out to leave a passage through the sealed edges into the woven screen.

---

This application is a continuation-in-part of my copending application Ser. No. 482,770, filed Aug. 26, 1965, and assigned to the same assignee as the present application. My present invention relates to a gas exchanger and an improved method for making such a gas exchanger for selectively transferring gas from one area to another.

As pointed out in the application referred to above, many applications and modern technology require the selective extraction of one gas from a group of gases and the transfer of that gas to another fluid medium. The relationship between the gas and the medium to which it is being transferred should be such that an optimum or nearly optimum exchanger relationship exists for transfer of gas. A preferred arrangement is one where the gas to be transferred and the receptive medium flow in nearly opposite directions across the membrane faces. A compact gas exchange apparatus is needed for transferring a selected gas to a receptive fluid medium. An exchange apparatus is arranged and sealed to prevent unwanted gasses from interfering with the exchange process and provide the most effective transfer of gas into the medium. This is done by using the counterflow principle.

One problem encountered in making a plurality of stacked chambers having membranes therebetween and alternately containing gas and receptive fluid medium is that when these elements of the gas exchanger are assembled and sealed together, the sealing compound runs into the hole through which the fluids involved are to be passed and blocks the hole to the point that the fluids are obstructed. One solution described in the aforementioned copending application has been to put preformed plugs in these areas cutting away the wire so that the plugs can be fitted into the cutaway space. These plugs do not always fit perfectly into the cutaway space and then the woven mesh between the membranes is cut leaving jagged edges which may break or cut the membranes and the plugs may adhere somewhat to the sealing compound making them difficult to remove without breaking or otherwise harming the sealing compound.

It is a principal object of my invention to provide an improved gas transfer apparatus which efficiently transfers a fluid from one medium to a receiving medium.

It is an object of my invention to provide improved means for leaving flow conducting holes through the sealing compound between porous membranes.

It is another object of my invention to provide an improved method and means for leaving flow conducting holes which may be easily applied in the manufacture of gas exchangers.

In brief, my invention involves the formation in situ of a soluble material, such as a water soluble wax plug-like spacer embedding the woven wire membrane spacer where it is desired later to have an opening, sealing stacked alternate wire spacer and permeable membranes together by means of a sealing compound around the edges of the stack and then washing away the soluble material leaving holes in the sealing compound through which the desired fluid mediums may enter and be circulated in the space between adjacent membranes.

In carrying out the objects of my invention, I provide a highly efficient gas exchange apparatus being a flat planar imperforate membrane barrier, selectively permeable to certain gases, which is placed in a chamber or between chambers through which one of those selected gases flows and a chamber in which flows a fluid that is receptive to the selected gas. A vulcanizing potting compound is employed to seal the edges of the apparatus save for entrance and exit openings, so that unwanted gases or other fluids are prevented from entering into either chamber and interfering with the gas transferring process taking place. In the preferred embodiment of this invention the corners of the apparatus are dipped into a polyethylene glycol material before the potting compound is applied. In this way, the polyethylene glycol material can be washed away later leaving access openings at each corner of the gas exchanger to the passage of fluids through the apparatus. A header can be placed over each corner so that fluid may be passed to and from the exchanger on a selected basis. Preferably the direction of flow of the gas in one chamber is at apposite or more or less right angles to the direction of flow of the receiving fluid through the other chamber so that an optimum amount of gas may be transferred through the semipermeable membrane to the receiving fluid. Also, a plurality of stacked chambers having membranes therebetween and alternately containing gas and receptive fluid medium are employed for increasing the efficiency and capacity of the gas transfer apparatus.

The attached drawings show preferred embodiments of my invention in which:

FIGURE 4 shows a stacking arrangement of the membraned package.

FIGURE 5 shows the sealed membrane package and illustrates the counterflow configuration through this package.

FIGURE 6 shows an enlarged view of a corner of FIGURE 5 with the waxy material washed away.

Figure 1:
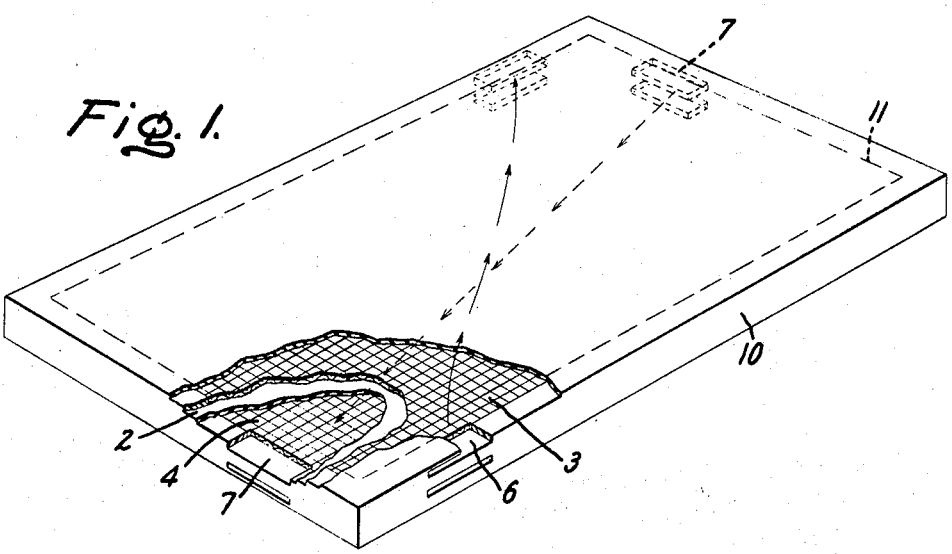
FIGURE 1 is a view of the gas transfer device of my invention.

In the view of the gas transfer apparatus shown in FIGURE 1, a suitable imperforate membrane 2 which is selectively permeable to certain gases, forms a separation means between chambers 3 and 4 through which the feed gas to be transferred and the receiving medium, respectively, flow. Particularly valuable as a mixture for use as a feed gas is oxygen or air. Membrane 2 is constructed of an imperforate material, such as the silicone rubber membranes of patent applications Ser. Nos. 241,346, filed Nov. 30, 1962 (now U.S. Patent 3,256,675); 247,904, filed Dec. 28, 1962 (now U.S. Patent 3,274,750); 269,430, filed Apr. 1, 1963 (now abandoned); 397,687, filed Sept. 21, 1964 (now U.S. Patent 3,350,687), and 466,698, filed June 6, 1965 (now U.S. Patent 3,325,330), by Walter L. Robb and assigned to the assignee of the present invention, which permit certain specific gases or vapors to pass therethrough to the substantial exclusion of others. The gases or vapors that permeate the membrane pass from the side of greater partial pressure to the side of lesser partial pressure.

For example, if the partial pressure of oxygen gas flowing through chamber 3 is 3.1 lbs./sq. inch, this would be in the case of oxygen in air, and the partial pressure of oxygen and the medium flowing through chamber 4 is far less, oxygen gas will readily permeate membrane 2 to mix with the second fluid medium. Thus, the fluid passing through chamber 4 will be enriched at the expense of the richer concentration of oxygen in chamber 3.

Figure 2:
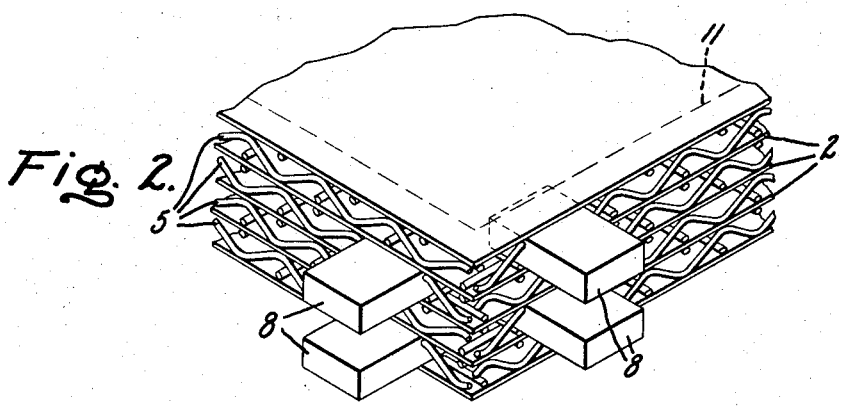
FIGURE 2 is an enlarged sectional view of the apparatus of FIGURE 1 before the sealing compound has been applied.
Figure 3:
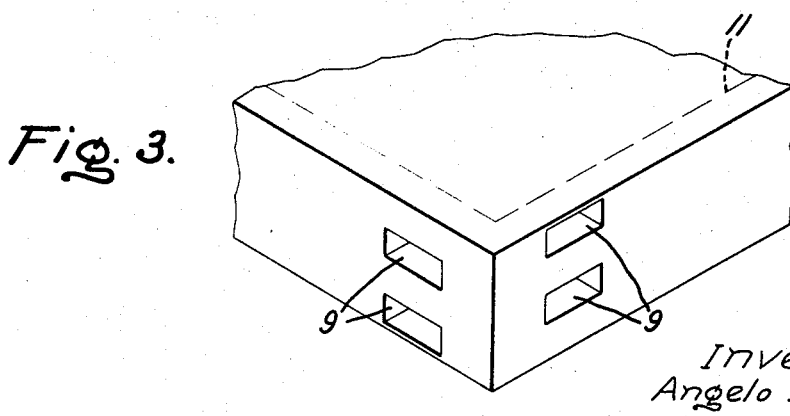
FIGURE 3 is an enlarged sectional view of the apparatus of FIGURE 1 after the sealing compound has been applied.

FIGURES 2 and 3 display the invention disclosed in the aforementioned copending application, Ser. No. 482,770, now U.S. Patent 3,354,618, except that soluble plugs are employed. The membranes 2 are stacked in a surface-to-surface parallel array with the screens 5 or other reinforcing means interleaved therebetween. The screens allow the passage of fluid in a longitudinal direction and cause turbulence and mixing. The screens allow the fluid to pass without rupturing the membrane since the membrane is supported at many points by the screens. Support provided by screens 5 can be sufficiently great so that large absolute pressure differentials can exist across the membrane, if this is desired. The screens may be fabricated of a suitable plastic or metal made in the conventional cross-hatched woven fashion.

The stack of membranes and screening is prepared for being secured together by interspersing the cutout edges 6, 7 of each screen with spacers 8, as shown in FIGURE 2, later withdrawal of which forms the ports or gaps 9 in the securing compound. These ports 9 are the entrance and exit openings through which gases and other fluids pass into the gas exchange apparatus. Spacers 8 are made of a material such as polytetrafluoroethylene that does not adhere to the sealing compound. Thus, when a planar configuration is employed with a plurality of membranes 2 as shown in FIGURES 1 and 2, spacers 8 are preferably flat and of a height equal to the desired space between the membranes 2 so that the spacers 8 not only form the entrance and exit channels, but also support the membranes in a desired relationship to each other while they are being secured together. While a rectangular membrane and spacer is shown in the illustrative figures it will be appreciated that these shapes are only one of the numerous shapes that can be employed successfully with my invention. By properly positioning spacers 8 the transfer gas flows through chamber 3 in a direction opposite to the direction that the receiving medium flows through chambers 4, so that a counterflow relationship between the gas and receiving medium is achieved.

When the membranes, screens and spacers are properly arranged in package form as shown in FIGURE 2, the edge of the package may be dipped in a suitable sealing compound 10, preferably a vulcanizing rubber compound such as the curable siloxane potting compounds described in U.S. Patent No. 3,133,891 to Louis Cezzeriat. This compound may be painted on so long as a firm seal is maintained. If the stacked membranes, screens and spacers are inserted into the potting compound, each edge of the apparatus should be inserted in the potting compound to a depth shown by the guidelines 11, i.e., sufficient to effectively secure the membranes together and form a secure leak-proof seal that prevents any extraneous gases from entering the apparatus and interfering with the transfer process taking place. Outside gas would disturb the partial pressure levels being maintained and also the flow relationship taking place within the device. As shown in FIGURE 2, spacers 8 extend beyond the line 11 so that the channels formed by these spacers extend completely through the potting compound and the entrance and exit channels formed are not affected by the sealing substance. The curable siloxane mentioned above sets quickly and without the application of any pressure to the apparatus. With the present sealing procedure intricate channels may readily be produced, to form the desired counterflow gas exchange apparatus, as previously described.

It is readily seen in FIGURE 1 that gas to be transferred enters the apparatus through one of the sets of ports formed by cutouts 7 for example, and diffuses throughout the adjacent chamber 3 to occupy the entire volume and cover the membrane area. In like manner, the gas receiving medium enters chamber 4 through entrance means or port to substantially fill the chamber and cover the other surface area of the membrane. The gas having the higher partial pressure now passes through the membrane in the direction of the fluid medium having the lower partial pressure.

A theoretical discussion of the operation of FIGURE 1 is to be found in my copending application referred to above and will be omitted here.

While the discussion above is directed to one membrane and supporting structure, it may be appreciated that a series of laminations are built up and that the transfer of gas will be faster and more uniform because of the greater amount of gas in proximity to the membranes because of receiving media on the other side. It is noted that any of the apparatus I have described may be constructed in the single or multiple stacked arrangement as described with respect to FIGURE 1.

FIGURES 4, 5, and 6 display the improved construction of the instant invention. The top element of the gas exchanger is a woven screen 12 having diagonally opposed corners coated with a thin layer of special wax 13 and the opposing corners removed as shown. The next element down from the top is a permselective membrane 14 which is adapted for the special purpose of selectively allowing diffusion of a particular gas through it. Each membrane element has all four corners removed. The third element is another woven screen 15 having different corners from the top element 12 coated with a thin layer of special wax and its other corners removed. The fourth element is another permselective membrane 16 similar in character to the second element and the fifth element is a woven screen 17 having different diagonal corners coated with a thin layer of wax the same as the first element. In this way, a stacking arrangement of many layers may be made and every alternate woven screen will have a wax coating over the same corners to allow flow through the gas exchanger. These elements are held together in a firm manner and the outer edge is coated with a sealing compound. Sealing may be accomplished by casting a narrow seal around the entire periphery between each layer of membrane with the exception of the four corners. Each woven screen separator has been coated on two opposite corners with a low temperature melting waxy material 13 which solidifies at room temperature and is very soluble in water so that it may be washed away by the application of water. The wax should be selected to have as low a melting point as possible but the melting point should be above any temperature to which it would be subjected in the process. An example of such waxes are the commercially available polyethylene gylcols with an average molecular weight between about 700–20,000 grams. These waxes are highly soluble in water to allow later removal by washing. Thus, the final product will be a stack of alternate layers of permselective membrane and wax coated screen with alternate layers of screen having the wax filled corners reversed as shown in FIGURE 5. Of the four corners, only two opposed ones are coated with the temporary covering material while the remaining corners are fully closed by sealing compound. These corners having been precut, are fully embedded in the sealing compound. This prevents leakage from within the exchanger. In order to seal these elements together, the assembly of a desired number of membranes and screens may be placed in a mold which is open along the four peripheral edges and the entire assembly is then cast in sealing compound so that each peripheral edge in sequence has sealing compound at ambient temperature to a depth depending on the size of the unit and the internal pressure which is expected to be applied. As readily seen, sealing compound will enter all peripheral edges where the wax is not present and will bond the woven screen to the permselective membrane around the edges since a thin sealant coating will finally completely cover the assembly. A sawcut is then made at each corner (as shown in FIGURE 5) to remove the sealing compound and expose the wax. The exposed screen edges contain wax at each corner. The removal of this wax is accomplished by flushing each corner with some suitable solvent such as warm water. When the wax is removed, the area of each screen which was formerly filled with wax now forms conduits 17, 18 and 19, 20 open to the flow of the fluids which are to be exchanged. Shapes other than rectangular can be employed within the spirit of this invention and cover plates are mounted above the top screen and below the bottom screen. For example, if a hexagonal shape is employed three fluid streams may be passed through the apparatus and the use of a round gas exchanger would simplify the sealing step since the round gas exchanger has a continuous edge which simplifies the sealing step that may be done by centrifuging or by rotating the edge of the round gas exchanger through a bath of sealing compound.

The configuration shown in FIGURE 5 allows flow which closely approaches counterflow relationship as shown by the flow lines. In this embodiment, if a carbon dioxide laden gas is supplied at one corner and exited at the other corner, then a scrub gas can be fed at a third corner and will flow in a more or less opposite direction from the feed gas thus extracting from the feed gas through the membranes, a large percentage of the carbon dioxide. The enriched scrub gas will then pass out of the gas exchanger at the fourth corner.

The blown up view (FIGURE 6) of the corner of FIGURE 5 shows the result when the sealing compound has penetrated some distance into the woven screen and lies between permselective membranes above and below this screen. When the wax is removed the exchange fluid can be passed in and out of the first and third layers shown here while the second and fourth woven wire layer will not admit passage since it has been blocked off by the sealing compound.

Some of the advantages of this improved method of forming are as follows. It is not necessary to cut the screen. This simplifies the manufacturing process and avoids weakening the screen. The sharp edges and burrs left after cutting will all be on the outside periphery rather than located internally where they might pierce the semipermeable membranes causing leakage between the streams. The removal of the plug-like wax spacers formed in situ is facilitated since the waxy plugs are removed by dissolution. Possible splitting and chipping of the sealing compound is avoided by washing the plug out. Finally, when the sealing compound is applied to the precut woven screen and the precut membrane the compound covers the cuts and a leak-free seal is assured.

The foregoing is a description of an illustrative embodiment of the invention, and it is applicant's intention in the appended claims to cover all forms which fall within the scope of the invention.

What I claim as new and desire to secure by Letters Patent of the United States is:

1. A method for making a gas transfer device comprising the steps of
    applying to opposed edge sections of woven screen separators a liquid material which solidifies at room temperature and may be removed by dissolution,
    permitting said material to solidify,
    placing a plurality of imperforate membranes in parallel surface-to-surface stacked array with woven screen separators therebetween so that first and second flow areas are formed alternately,
    applying a siloxane potting compound to the edges of the membranes to seal and to enclose the first and second flow areas and effectively separate them from each other so that fluid flowing in a flow area must permeate a membrane to reach another flow area, and
    dissolving away said material from said opposed edge sections so that passages are formed to permit flow to be directed in substantially opposite directions through the first and second flow areas for providing a partial pressure differential across the membrane that results in optimum gas transfer relationship.

2. A method for making a gas transfer device as set forth in claim 3 in which
    the material is an ethylene polyglycol derivative.

3. A method for making a gas transfer device as set forth in claim 2 in which
    said ethylene polyglycol material has an average molecular weight between about 700–20,000 grams.

4. A method for making a gas transfer device as set forth in claim 1 the step of
    cutting off the corners of said sealed stacked array after applying said siloxane potting compound and before dissolving said material away.

5. A method for making a gas transfer device as set forth in claim 3 in which said siloxane potting compound is at room temperature.

6. In a method for making a gas transfer device as set forth in claim 3 the step of
    removing edge sections remote from said opposed coated edge sections before applying said material so that said sealing material will cover said edge sections.

References Cited

UNITED STATES PATENTS

| | | | |
|---|---|---|---|
| 1,983,939 | 12/1934 | Kehr | 156—305 X |
| 2,608,502 | 8/1952 | Merriman | 156—289 X |
| 3,033,734 | 5/1962 | Price | 156—305 |

HAROLD ANSHER, *Primary Examiner.*

U.S. Cl. X.R.

156—537, 293, 297, 305, 329; 55—16, 158